United States Patent [19]

Saljé et al.

[11] 4,406,202

[45] Sep. 27, 1983

[54] ROTATABLE ARTICLE, SUCH AS A TOOL, PROVIDED WITH MEANS FOR DAMPING VIBRATION

[75] Inventors: Ernst Salje, Schulheide 4, Bendestorf, Fed. Rep. of Germany, D2106; Ulrich Bartsch, Braunschweig, Fed. Rep. of Germany

[73] Assignee: Ernst Salje, Bundestorf, Fed. Rep. of Germany

[21] Appl. No.: 263,175

[22] Filed: May 13, 1981

Related U.S. Application Data

[62] Division of Ser. No. 3,786, Jan. 15, 1979, Pat. No. 4,285,260.

[30] Foreign Application Priority Data

Jan. 17, 1978 [DE] Fed. Rep. of Germany ....... 2801811

[51] Int. Cl.³ .................. B27B 33/08; B23B 61/02
[52] U.S. Cl. ................................ 83/835; 83/837; 83/847; 83/676; 144/218; 76/112; 51/206 R
[58] Field of Search ............... 83/835, 676, 837, 847; 144/218, 240; 76/112; 51/206 R

[56] References Cited

U.S. PATENT DOCUMENTS

| 3,174,360 | 3/1965 | Katzenberger | 74/574 |
|---|---|---|---|
| 3,799,025 | 3/1974 | Tsunoda | 83/835 |
| 4,034,639 | 7/1977 | Caldwell | 83/835 |
| 4,046,230 | 9/1977 | Troyer | 74/574 X |
| 4,106,382 | 8/1978 | Salje et al. | 83/835 |
| 4,187,754 | 2/1980 | Beaty | 83/847 |

FOREIGN PATENT DOCUMENTS

| K-4195 | 8/1944 | Fed. Rep. of Germany . |
|---|---|---|
| 1154312 | 9/1963 | Fed. Rep. of Germany . |
| 2129112 | 12/1972 | Fed. Rep. of Germany . |
| 876921 | 8/1942 | France . |
| 347949 | 5/1931 | United Kingdom . |
| 693499 | 7/1953 | United Kingdom . |
| 695300 | 8/1953 | United Kingdom . |
| 744041 | 2/1956 | United Kingdom . |
| 753032 | 7/1956 | United Kingdom . |
| 1169063 | 10/1969 | United Kingdom . |

Primary Examiner—Donald R. Schran
Attorney, Agent, or Firm—Holman & Stern

[57] ABSTRACT

The article, such as a circular saw tool or a gear wheel, has a visco-elastic synthetic-resin damping layer between, on the one hand, a portion of the body of the article which is integral with, or securely attached to, a work region adapted to interact with another article, and, on the other hand, a counter-element which extends parallel thereto. The damping layer is arranged in the interior of the article in a region covered by an outer member integral with or securely connected to the body. The parts between which the damping layer lies are connected together by the damping layer in a manner which permits shear stresses to occur in the damping layer.

4 Claims, 6 Drawing Figures

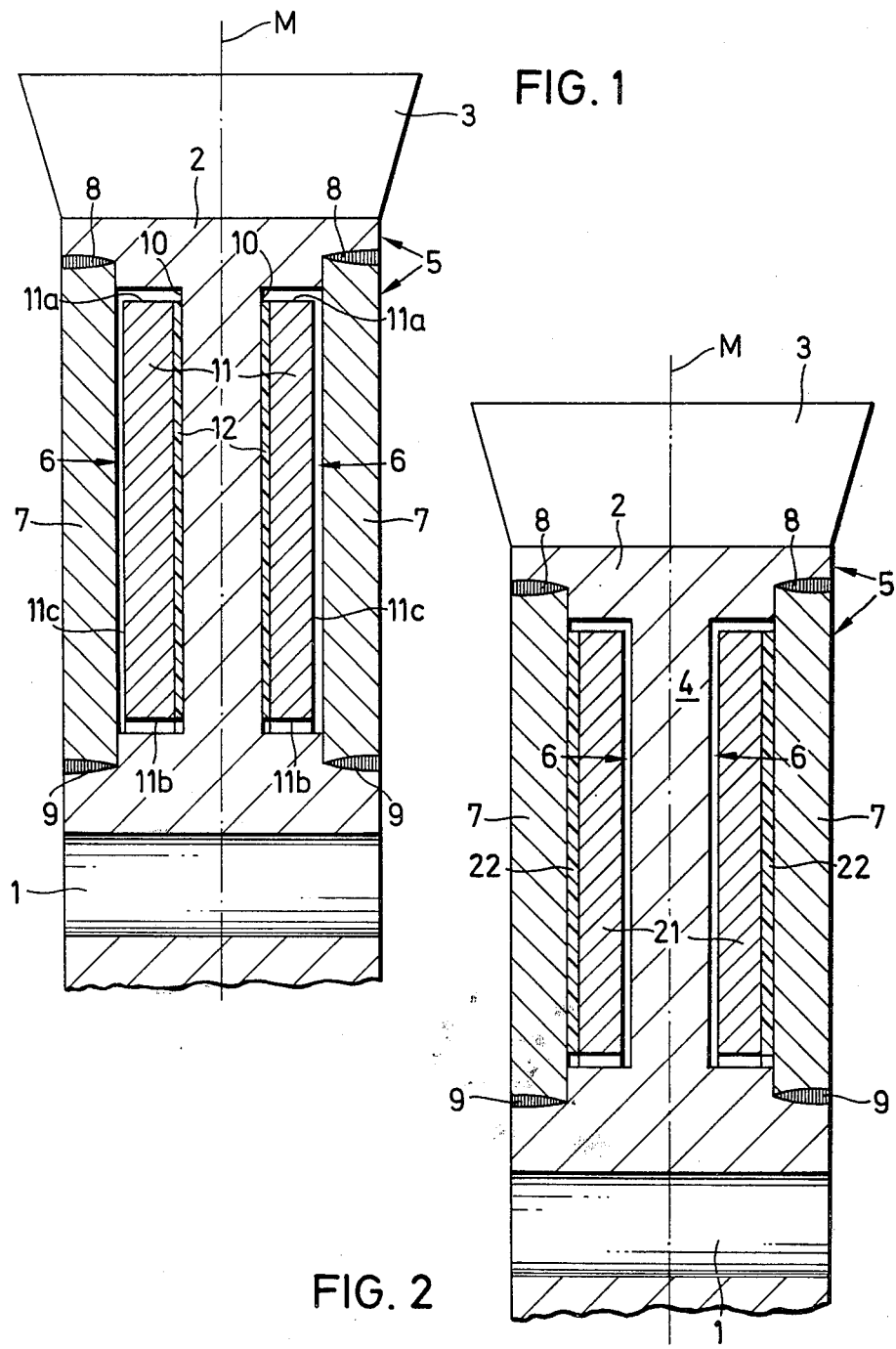

ROTATABLE ARTICLE, SUCH AS A TOOL, PROVIDED WITH MEANS FOR DAMPING VIBRATION

This is a divisional of application Ser. No. 003,786, filed Jan. 15, 1979, now U.S. Pat. No. 4,285,260.

BACKGROUND OF THE INVENTION

1. Field of the Invention

This invention relates to a disc-like rotatable article having vibration damping means and comprising a body with a work region (e.g. having teeth or one or more cutting blades) adapted to interact with another article (e.g. a workpiece or another disc-like rotatable article).

2. Description of the Prior Art

The reduction of noise occurring during idling running and particularly during the working or chip removing process of rotating parts, in particular tools such as saw blades, constitutes an urgent but difficult problem. This applies particularly to tools for the treatment of wood and synthetic resin, but also for metalworking, for example light-metal saws, tools for the machining of steel, and so on.

It has been found that a reduction of the noise may be obtained for a circular saw tool if the tool body forming the so-called stock blade is provided on at least one side, preferably on both sides, with a damping layer formed by an adhesive and a cover arranged on it as a counter-element, namely by damping the saw-blade vibrations causing the noise. The layer in the form of an adhesive not only has the purpose of attaching and retaining the cover on the respective part of the tool, but at the same time it fulfils an important function in respect of vibration damping. The externally excited or self excited vibrations of the rotating tool cause respective thrust motions between the cover and the tool body proper (stock blade), whereby corresponding shear stresses are produced in the damping layer.

It is important for the use of tools of such construction that the elements located on the damping layers retain their position and are not released by the loads occurring. On the other hand, however, as high a damping as possible is to be attached. Therefore demands are involved which contradict each other to a large extent.

There is therefore a need to overcome existing difficulties and defects and to provide an article of the kind referred to above which has advantageous properties, and to construct it in such a manner that it can comply with a variety of requirements. This applies in particular in respect of favourable stiffness conditions, mechanical strength, effective protection of the damping system, and reliable holding-together of the parts associated therewith, while at the same time attaining a highly satisfactory damping effect. With all this, the loads to be expected in practical use, particularly those on the outer or lateral portions of the article, should be absorbed reliably.

SUMMARY OF THE INVENTION

According to the invention, in a tool or other rotatable article having at least one damping layer and an associated counter-element, the damping layer is arranged in the interior of the article in a region which is covered outwardly by an outer member which is securely attached to the body of the article or tool or forms a part thereof, wherein the parts imprisoning between them the damping layer are connected together by means of the damping layer in a manner which permits shear stresses to occur therein.

The invention provides a tool, for example a circular saw tool, or another article which rotates in operation, such as a transmission element, e.g. a gear wheel, which is characterised by a number of important advantages. The damping layer is accommodated in a completely protected manner, so that it cannot be damaged or destroyed. The outer member is effectively part of the body of the article and may be so dimensioned that a high static stiffness of this outer member and thus of the entire body of the article results therefrom. Thereby the vibration tendency of the tool or other article is considerably reduced and also the load-bearing ability during operation is influenced in a favourable manner, because mechanical loads inclusive of friction forces acting upon the lateral surfaces, as well as thermal loads, can be absorbed in a reliable manner. Furthermore the dynamic stiffness of the article is increased, this being particularly advantageous for the damping behaviour. Moreover, the outer member also contributes to the screening effect, i.e. for shielding body sound.

Advantageously two or more damping layers with associated counter-elements are present, particularly in a symmetrical arrangement in relation to a central plane of the article. The respective damping layer is preferably arranged outside the neutral fibre layer, i.e. the respective location or plane in which, when a load occurs, the stress in the material is zero, whereas it assumes positive values (compression) on the one side and negative values (tension) on the other side. In a disc-shaped article, corresponding loads result inter alia with axial vibrations, which are generally causative for noise generation. In a symmetrically constructed tool, e.g. a circular saw blade, the neutral fibre layer is located in the central plane.

As damping layer in particular an adhesive comes into consideration which has suitable properties, for example a loss factor $\eta = 0.5$ to 2 in the range of from 1 to 5 kHz. In comparison with the material of the body of the article and the outer members or the counter elements, respectively, the material for the damping layer has a low elasticity modulus. This, too, leads to effective shielding of the body sound. In particular, the elasticity modulus may amount to $(0.5 \text{ to } 5) \cdot 10^9$ dyn/cm$^2$.

In a preferred embodiment of the article the outer member is securely connected to the work region, for example, in a saw tool, to the peripheral region supporting the teeth, in such a manner that the member itself forms a body which is directly involved in the absorption of the working forces.

The body of the tool or article may comprise at least one chamber in which at least one damping layer and at least one counter-element located thereon is disposed. In this case various possibilities exist in respect of the construction in detail and the arrangement of the elements. Thus, inter alia, a damping layer may be provided on the base surface of the chamber. Alternatively or additionally, a damping layer may be arranged on the inside of the outer member. In this case an advantageous large spacing may be obtained from the plane of the tool or article which must be regarded as neutral fibre layer in relation to vibration effects occurring, normally the central plane thereof. It may also be satisfactory to provide a respective damping layer with associated counter-elements on the inside of the outer member as well as also on the opposite side of a part associated with the body of the tool or other article, for example a chamber in this body.

In a particular embodiment of the article a counter-element having on both sides thereof damping layers located between it and the insides of the outer members, is arranged in a chamber provided between two outer members. This is particularly favourable inter alia because the outer members associated with the body of the tool or article have a large spacing from the neutral fibre layer, so that high stiffness and good damping effect results therefrom, while the space therebetween is utilized for the accommodation therein of the counter element. The outer periphery and/or the inner periphery of the counter-element may be supported on the body of the article in a centering manner.

In accordance with a fundamental idea of the invention, a further particular embodiment consists in that at least one damping layer forms a part of the force path between two parts of the body of the article which are in mutual torque-transmitting connection. Owing to such inclusion of the damping layer in the force path during the operation of the article a further direction (in the peripheral sense) in the stress state of the damping layer becomes effective, this having a favourable effect upon the damping. The counter-element which is located on the side of the damping layer which is remote from that part of the body of the article which is connected together with the work region thereof may, in such an article, be formed directly by another portion of the body of the article.

As in the other embodiments referred to, in such an embodiment the counter-element is a part which is not rigidly or non-rotatably connected to a work region of the article, for example the peripheral region supporting the teeth of a circular saw blade, but rather is a part which is permitted a certain mobility relatively to the part of the body of the article which is rigidly connected to the work region, so that the damping mechanism discussed is realized in the desired manner with a shear stress loading of the damping layer.

The construction of the multiple-part body of the article and the arrangement of one or more damping layers may be effected in various ways, so that different points of view and requirements may be taken into account.

In an advantageous embodiment two parts of the body of the article which are in connection by one or more damping layers located in the force path are supported on each other in a centering manner. This ensures, for the attainable damping behaviour, perfect positioning of the two parts relative to each other.

Two outer members provided in a symmetrical arrangement of the article may be provided on a part of the body of the article which is designed for the initiation of the torque, whereas a middle portion of a second part of the body of the article supporting the work region is arranged to lie therebetween by its damping layers deposited on its two sides; or the outer members are provided on a part of the body of the article which forms or comprises the work region, wherein then a portion of the other part of the body of the article extends therebetween by its associated damping layers.

BRIEF DESCRIPTION OF THE DRAWINGS

The invention will be described further, by way of example, with reference to the accompanying drawings, in which:

FIGS. 1 to 6 show various embodiments of circular saw tools in axial section, the portion of the tool below the axis being omitted.

DESCRIPTION OF THE PREFERRED EMBODIMENTS

Figures 3, 4:
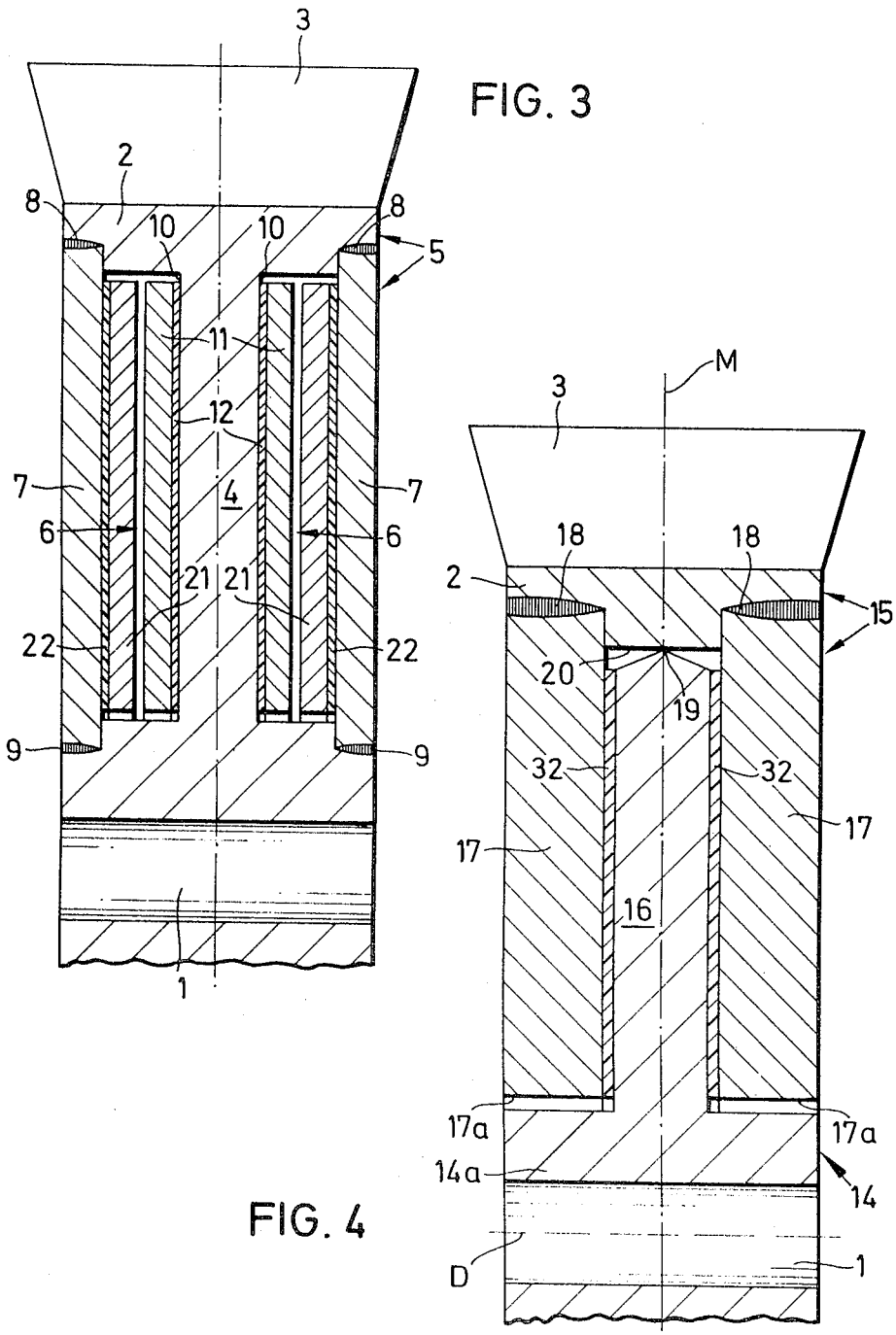

In each of the embodiments according to FIGS. 1 to 3, a main part 4 of a tool body 5 is provided with a central bore 1; in its peripheral region 2 it supports teeth 3, and it comprises two circular annular chambers 6 which are delimited by outer members 7. The members 7 are regarded in this case as parts of the tool body 5, and each is securely connected by circularly extending weld seams 8, 9 to the main part 4 and therefore to the peripheral region 2 which supports the teeth 3. They thus form supporting elements of the tool body and also absorb the mechanical loads occurring during the operation of the tool, inclusive of the friction forces acting from outside. Moreover they can conduct away heat produced, in particular from the teeth 3. The connection of the outer members 7 to the main part 4 of the tool may alternatively be effected by rivetting other suitable fixing means in a manner different from the construction illustrated, and is performed after the elements to be accommodated in the chambers 6 have been positioned.

In the embodiment according to FIG. 1, a damping layer 12 is provided between the circular plane surface 10 forming the base of each chamber 6 and a circular annular counter-element 11 (e.g. of steel or another metal or alloy); the damping layer 12 is preferably made of a synthetic resin adhesive having visco-elastic behaviour and has a thickness which favourably lies in the range of from 0.01 to 0.2 mm or may even be greater. The material of the damping layer has advantageously a high elasticity and a hardness which is not too great. For high damping a shear modulus $G=(0.2$ to $2)\cdot10^9$ dyn/cm$^2$ at frequencies of from 1 to 5 kHz is recommended.

The counter-elements 11, the thickness of which preferably amounts to a few tenths of a millimeter, or more, are spaced at the inner and outer edge 11a, 11b as well as at the outer surface 11c from the surfaces of the parts 4 and 7 of the tool body facing them, so that they are independent of the tool body or a part supporting the teeth, respectively. Upon the occurrence of vibrations, each of the counter-elements 11 tends to move relatively to the main part 4 of the tool body, whereby shear stresses are produced in the damping layers 12, which in consequence provide a high damping effect.

With all this, the damping layers 12 with the counter-elements 11 are located completely protected within the regions limited by the outer members 7. The thickness of the outer members 7 may in particular amount to from 0.2 mm to 0.8 mm or, however, may even be still greater.

In the embodiment according to FIG. 2, the outer members 7 of the tool body are associated with damping layers 22 and counter-elements 21 which are of the kind described above in conjunction with FIG. 1, the statements made in respect of the damping mechanism applying correspondingly. In the present case the damping layers 22 have a relatively large spacing from the central plane M of the tool, this being particularly favourable in respect of the damping effect.

Furthermore, as illustrated in FIG. 3, damping layers 12, 22 and counter-elements 11, 21 may be provided on the outer members 7 as well as on the surfaces 10 of the main part 4 of the tool body.

Figure 5:
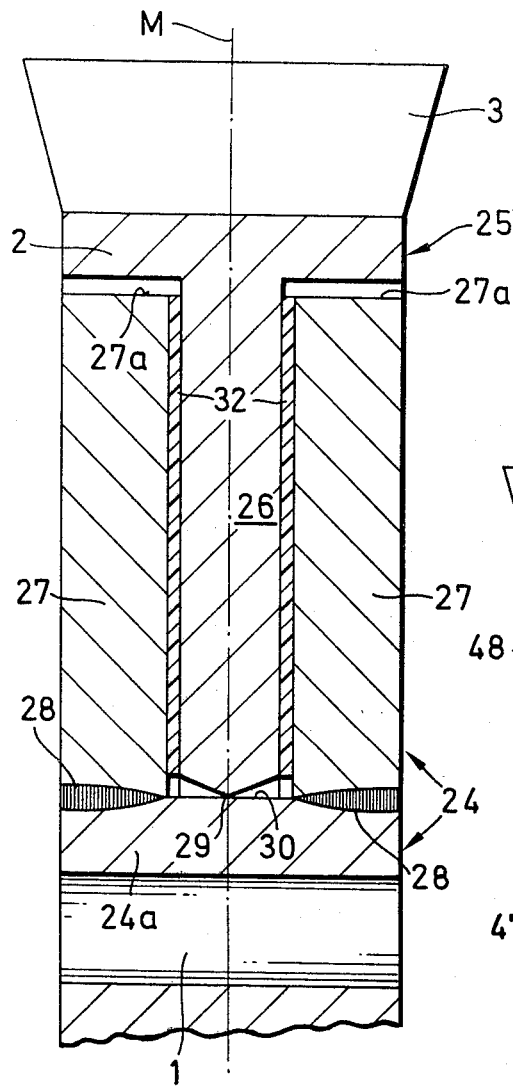

The particular embodiments of the circular saw tool illustrated in FIGS. 4 and 5 are constructions in which the tool body consists of two parts 14 and 15 (FIG. 4) or 24 and 25 (FIG. 5), respectively, which are constructed in the form of rings or annular discs and which support each other in the radial direction in a centering manner. One (the radially outer) part 15 or 25, respectively, comprises the peripheral region which supports the teeth 3, whereas the other (radially inner) part 14 or 24, respectively, contains the central bore 1 and is designed to initiate the driving torque.

In the embodiment according to FIG. 4, the part 14 comprises a disc body 16 which extends symmetrically in relation to the central plane M and the outer periphery of which is chamfered in a roof-like manner; its edge region 19 is formed by the apex of the chamfer and may be a flattened edge, and its abuts a cylindrical inner surface 20 of the other part 15 in such a manner that the two parts fit into each other without clearance and have the same concentric position in relation to the axis of rotation D of the tool. The peripheral region 2 forming the teeth-supporting part of the tool body is securely connected by circularly extending weld seams 18 to two outer members 17 whose inner edges 17a are spaced from the corresponding cylinder surface on a hub-like body 14a of the other part 14. Damping layers 32, consisting preferably of an adhesive having visco-elastic properties, in particular a synthetic resin adhesive, are provided between the outer members 17 and the disc-body 16 and form the torque-transmitting members between the parts 14, 16 and 15, 17 of the tool body.

Whereas in the embodiments according to FIGS. 1 and 3 the counter-element 11, 21 located on the damping layers 12, 22 are each parts which are completely separate from the tool body proper 5, in the construction according to FIG. 4 and likewise in that according to FIG. 5 the counter-element located on the damping layer is formed by a part which must be regarded to belong to the tool body, but which, in the present case also, is not rigidly or non-rotatably connected to the peripheral region supporting the teeth, but which is merely radially supported relatively to the latter. The construction and the arrangement is made in such a manner that, upon the occurrence of vibrations, relative movements are possible between the parts adjacent the damping layer 32 and thus the damping layer is subjected to shear stresses, additionally the peculiarity existing in this case that a further axis or direction of the shear stress state leads to an additional damping effect.

In the embodiment according to FIG. 5, a central disc-body 26 extends radially inwardly from the part 25 of the tool body which comprises the peripheral region 2 supporting the teeth 3, whereas the other part 24 into which the driving motion is introduced comprises two outer members 27 which are securely connected to it or to a hub body 24a associated therewith, respectively, by means of circular annular weld seams 28. In the present case also, damping layers 32 constituting torque-transmitting and vibration damping members are provided between the outer members 27 and the disc-body 26. The outer edges 27a of the outer members 27 have a small spacing from the opposed cylindrical surfaces of the peripheral region 2 supporting the teeth 3. As in the construction according to FIG. 4, a centering support other of the two parts 24 and 25 of the tool body relative to each is provided by the fact that an edge region 29 of the disc-body 26, which is chamfered on both sides at its periphery, abuts a cylindrical outer surface of the other part 24, 24a.

Figure 6:
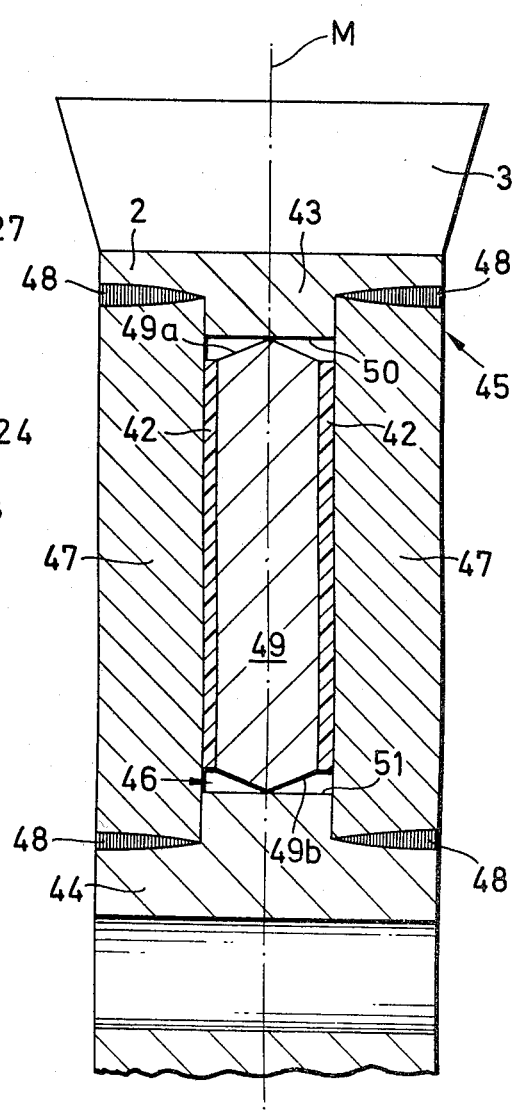

FIG. 6 illustrates an embodiment of a circular saw tool whose tool body 45 consists of a part 43 which comprises the peripheral region (work region) 2 with the teeth 3, a hub part 44 and two outer members 47 which are connected to the two other parts 43 and 44 by weld seams 48 or in another suitable manner. The parts referred to form a circular annular chamber 46 in the interior of the tool body 45 in which a counter-element 49 is disposed. Visco-elastic damping layers 42 are located on both sides thereof, and by means of them it is in connection with the outer members 47. In a radial direction the counter-element 49 is supported on cylindrical surfaces 50, 51 of the parts 43 and 44 by the apices of chamfered regions 49a and 49b located at the outer periphery and at the inner periphery. In this construction the counter-element 49 is accommodated in a particularly favourable manner in a central region of the tool. In this region, supporting parts of the tool body would not contribute to the stiffness as much as the outer members arranged at a spacing from the central plane M (neutral fibre layer).

In the various embodiments explained the outer members consist preferably of the same material as the other parts of the tool body, in particular of steel. However, the use of other work materials is not excluded.

The term teeth is to be understood to comprise all constructions which are usual for circular saws, including cutting blades of tool steel, hard metal, or ceramic, either in a secure connection or in a clamped connection.

As has been explained above in connection with circular saws, other rotatably drivable tools may also be constructed in a corresponding manner in accordance with the invention, such as circular cutters.

In the embodiments of circular saw tools discussed, the work region of the tool body is formed by the peripheral region supporting the teeth. However, the invention comprises also tool constructions in which the work region of the tool body may extend at least partially at the front face, appropriate cutting blades or the like then being present there. This applies for example to end milling cutters.

Moreover the invention extends also to other articles of the kind referred to further above or initially, in which vibration and noise problems exist, thus inter alia in particular also rotating drive elements, such as gear wheels, rotating parts of belt drives etc., as well as similar machine elements. Statements made in the explanation of the embodiments of circular saw tools in respect of the tool body and other parts applies in the appropriate sense and correspondingly to the body and to further associated parts of such drive or machine elements.

We claim:

1. A vibration-damped, disc-like rotatable tool having two radial faces, a central axis of rotation, a rotary drive means for driving the tool about said axis of rotation, a central plane extending radially from the axis, and a work region in the peripheral region of the tool adapted to interact with another article comprising:

a first member comprised of two like annular disc members extending substantially parallel to said central plane of the tool spaced equidistantly therefrom to form an annulus therebetween and securely connected at their outer peripheries to the work region, the inner peripheries of said disc members being spaced from the rotary drive means;

a second disc-like annular member extending radially within said annulus in spaced relation to the adjacent walls of said discs of said first outer member and having a central radial plane coincident with said central plane of the tool and connected at its inner periphery to said rotary drive means to be driven about the axis of rotation thereby; and a damping layer of visco-elastic material in said annulus on each side of said second disc-like member solely connecting said first and second annular disc members together so that said damping layers solely transmit therethrough the torque from said rotary drive means and said second member to said first member and shear stresses occur in said damping layers.

2. A rotatable tool as claimed in claim 1 wherein said first annular member is centrally supported with respect to said central plane by said damping layers on said second annular member.

3. A rotatable tool as claimed in claim 1 wherein said first annular member is integral with the peripheral region of the tool.

4. A vibration-damped, disc-like rotatable tool having two radial faces, a central axis of rotation, a rotary drive means for driving the tool about said axis of rotation, a central plane extending radially from the axis of rotation, and a work region in the peripheral region of the tool adapted to interact with another article comprising:

a first disc-like annular member having a central radial plane coincident with the central plane of the tool extending radially and connected at its outer periphery to said work region;

a second member comprised of two like annular disc members extending substantially parallel to said first member on opposite sides of said first member equidistantly spaced therefrom and connected at their inner peripheries to said rotary drive means and being in spaced relation at their outer peripheries to said work region; and a damping layer of visco-elastic material in each space on opposite sides of said first member solely connecting said first and second disc members together so that said damping layers solely transmit therethrough the torque from said rotary drive means and said second disc member to said first member and shear stresses occur in said damping layers.

* * * * *